Aug. 7, 1928.

L. J. SCHROEDER

MOLD

Filed May 7, 1927   3 Sheets-Sheet 1

1,679,788

Inventor:
Louis J. Schroeder.

Aug. 7, 1928.

L. J. SCHROEDER

MOLD

Filed May 7, 1927

Inventor:
Louis J. Schroeder
by Charles S. Gooding
Att.

Patented Aug. 7, 1928.

1,679,788

UNITED STATES PATENT OFFICE.

LOUIS J. SCHROEDER, OF WATERTOWN, MASSACHUSETTS, ASSIGNOR TO HOOD RUBBER COMPANY, OF WATERTOWN, MASSACHUSETTS, A CORPORATION OF MASSACHUSETTS.

MOLD.

Application filed May 7, 1927. Serial No. 189,683.

This invention relates to a mold and particularly to a type of mold for forming electric storage battery casings from plastic material such as rubber and the like.

The object of the invention is to provide a mold of novel construction in which temporarily plastic material may be molded into articles of various forms according to the shape of the forming plates employed, said mold being associated with a hydraulic press of well-known construction and embodying therein a mold retaining member yieldingly mounted upon the base of said hydraulic press, the forming plates being mounted upon a piston rod of said press and having a reciprocatory movement imparted thereto to first lower said plates into a passage provided in the mold retaining member, said forming plates being automatically closed during the downward movement thereof, and after the ram head of the hydraulic press has been operated to move a form into a position to co-operate with the plates to mold the article therebetween and has been withdrawn, said forming plates are automatically opened by an upward movement of the piston rod and plates.

Another object of the invention is to provide a mechanism by means of which one of the forming plates may be lowered into an extreme open position, so that the article molded may be removed from between the forming plates without interference therewith or with the form which is attached to the ram head.

Still another object of the invention is to provide a mechanism for raising and lowering the mold retaining member relatively to the base of the hydraulic press, whereby inequalities in the faces of the forming plates may be compensated for.

The invention consists in a mold for forming articles from plastic material as set forth in the following specification and particularly as pointed out in the claims thereof.

Referring to the drawings.

Like numerals refer to like parts throughout the several views of the drawings.

Figure 1:
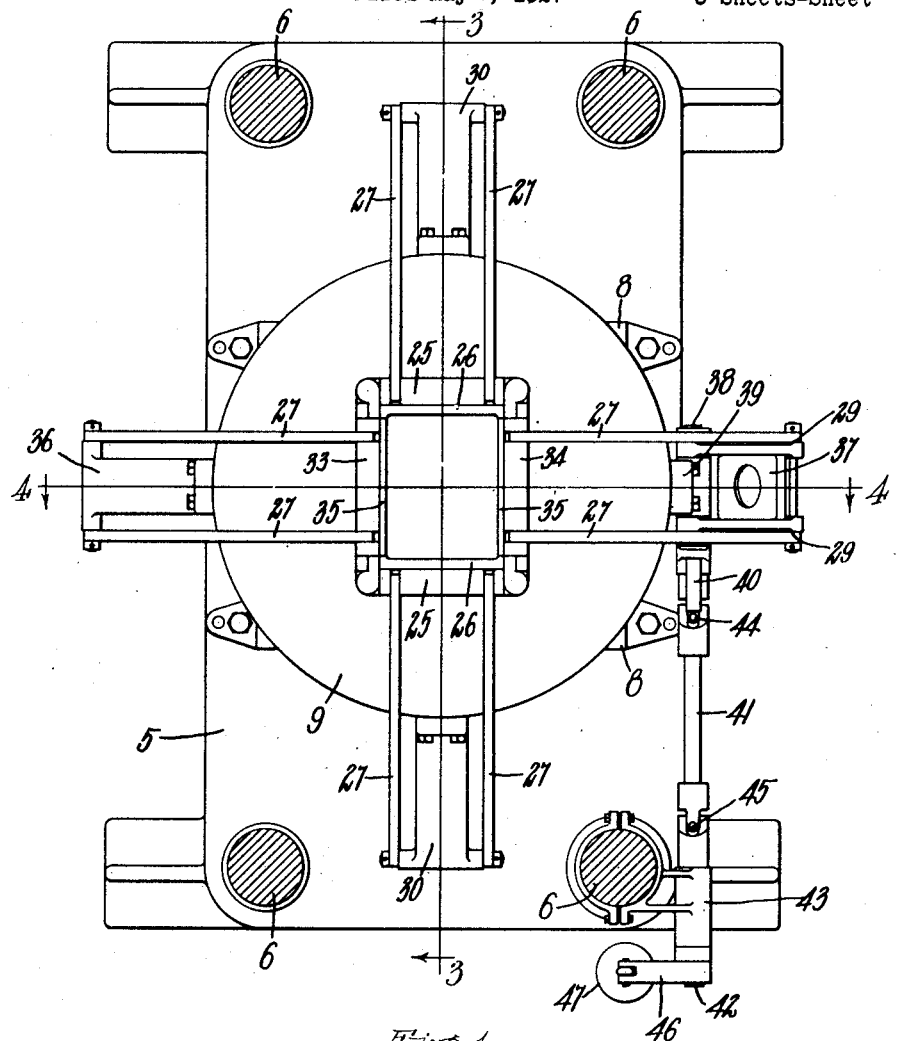
Figure 1 represents a plan view of a mold embodying my invention, the ram head being removed, the guide rods for said head being shown in section, and the forming plates of the mold being located in their closed positions.

In the drawings, 5 represents a base, the latter comprising a member of a hydraulic press which may be of any well-known construction, and 6 are vertical guide rods for a ram head 7, the latter being mounted upon said guide rods and adapted to have a vertical reciprocatory motion imparted thereto in a manner well known to those skilled in the art.

Rigidly secured to the upper surface of the base 5, in any suitable manner, are supports 8, and mounted upon said supports in longitudinal alignment with the latter and with a piston rod 17 of the hydraulic press is a mold retaining ring 9. The retaining ring 9 is yieldingly mounted upon the supports 8, the under surface of said ring resting upon a plurality of coil springs 10, each of which is located within a recess 11 provided in the upper surface of the supports 8, and said springs normally hold said ring separated a slight distance from the upper surface of said bed plate.

Figure 2:
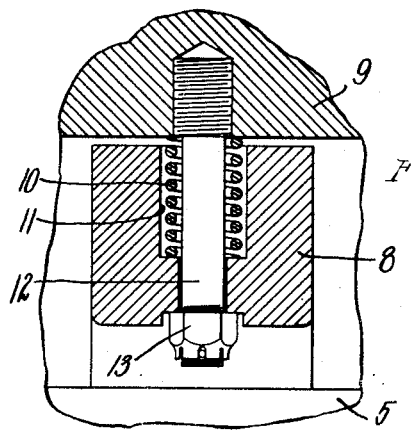
Fig. 2 is an enlarged detail section taken on the line 2—2 of Fig. 4.

The mold retaining ring 9 may be adjusted vertically relatively to the supports 8 and base 5 by manipulating nuts 13, which have screw-threaded engagement with studs 12, the latter being rigidly fastened in the ring 9 and projecting downwardly therefrom through the coil springs 10 and supports 8, as illustrated in Fig. 2. By manipulating the nut 13, the space separating the upper and under surfaces of the supports 8 and ring 9 respectively may be increased or diminished, the tension upon the spring 10 increased or decreased, and other results hereinafter to be set forth may be accomplished.

Figure 3:
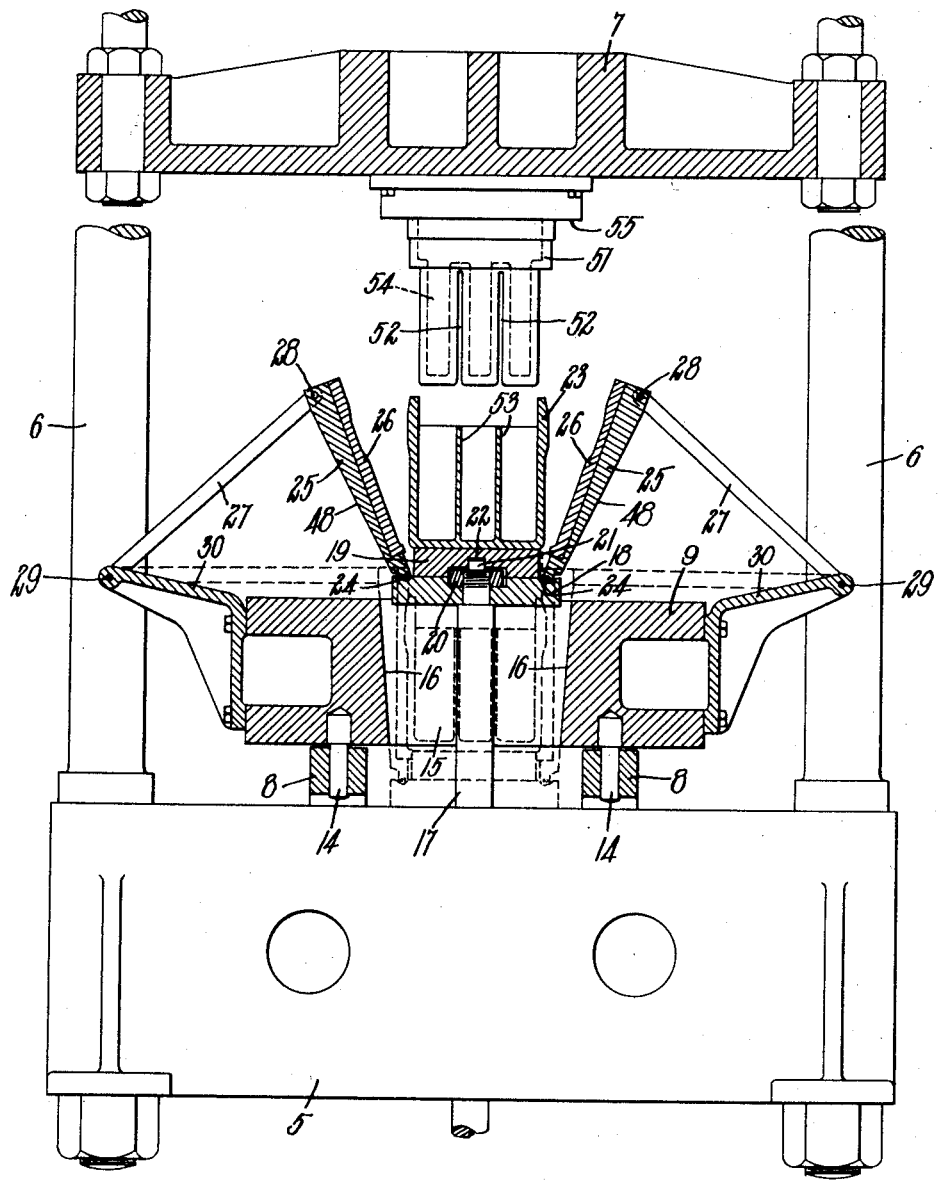
Fig. 3 is a central vertical section taken on the line 3—3 of Fig. 1, the forming plates being illustrated in their open positions.

The ring 9 is held against lateral displacement upon the supports 8 by means of a plurality of positioning pins 14, which are rigidly secured in any suitable manner in said ring and project downwardly therefrom and into and through holes provided therefor in the supports 8, as illustrated in Fig. 3.

The mold retaining ring 9 is provided when said plate is located in the dotted position through and having oppositely disposed sides 16 thereof tapering downwardly. The longitudinal median line of the passage 15 is coincident with that of the piston rod 17 of the hydraulic press, and rigidly secured to the upper extremity of said piston rod is a bottom plate 18 which constitutes a support for a bottom forming plate 19 and also for the side forming plates of the mold. The bottom plate 18 is secured to the piston 17 by a nut 20, and a projection 21 is formed upon the upper extremity of said piston rod and projects into a recess 22 formed in the under surface of the bottom forming plate 19, thereby positioning the latter centrally upon the bottom plate 18.

Figure 4:
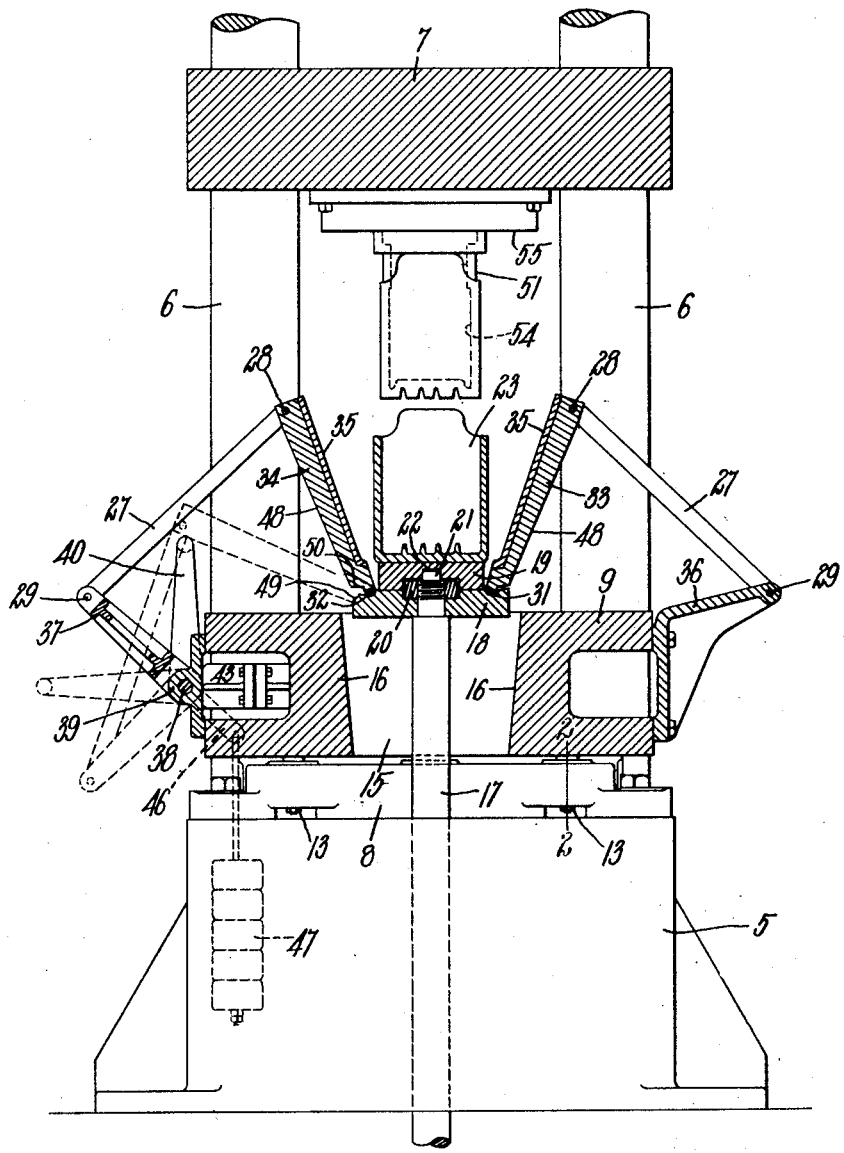
Fig. 4 is a central vertical section taken on the line 4—4 of Fig. 1.

The article to be molded, in this instance a casing 23 for an electric storage battery, is illustrated in Figs. 3 and 4 resting upon the upper surface of the bottom forming plate 19, and pivotally mounted at 24 upon oppositely sides of the bottom plate 18 are oppositely disposed side forming plates 25, each embodying therein a face plate 26 for shaping an exterior surface of said casing. The side plates 25 are each operatively connected by a pair of links 27 with the ring 9, one end of each of said links being pivotally attached at 28 to the top of said plates, and the opposite ends of each of said links being pivotally attached at 29 to brackets 30 which are rigidly secured to the periphery of said ring.

Pivotally attached at 31 and 32 to the bottom plate 18 are other oppositely disposed side forming plates 33 and 34 respectively, each embodying therein a face plate 35 for shaping an exterior surface of said casing 23. The plate 33 is operatively connected by a pair of links 27 with the ring 9, said links being pivotally attached at 28 to the top of said plate and at 29 to a bracket 36 in turn rigidly secured to the periphery of the ring 9.

Another pair of links 27 are pivotally connected at 28 to the top of the side plate 34 and at their opposite ends at 29 to the opposite sides of a rocker arm 37, the latter being rigidly secured to a rock shaft 38 mounted in a bracket 39 fastened to the periphery of the ring 9. An operating lever 40 is rigidly fastened to the rock shaft 38 adjacent to a side of the bracket 39, and by moving said operating lever from the position illustrated in full lines to that illustrated in dotted lines in Fig. 4, the side forming plate 34 may be moved from a normal open position also illustrated in full lines in Fig. 4 to the dotted line position illustrated in said figure, the latter position being an extreme open position.

The shaft 38 also embodies therein members 41 and 42, the latter member being mounted to rotate in a bracket 43 fastened to one of the guide rods 6 of the hydraulic press. The shaft member 41 is operatively connected at its opposite ends with the members 38 and 42 by universal joints 44 and 45, respectively, the latter being provided for the purpose of compensating for the vertical movement permitted by the adjustment of the mold retaining ring 9 upon the supports 8. An arm 46 is rigidly secured to the outer extremity of the shaft member 42, and suspended from the outer extremity of said arm is a counterweight 47, the latter being sufficiently heavy to allow the side plate 34 to be easily operated, and normally holds the said plate in the full line position indicated.

The outer surface of the side plates 25, 33 and 34 tapers downwardly at 48 toward the inner face of said plates, said taper corresponding to the taper of the surfaces 16 of the passage 15. A portion of the side of the bottom plate 18 to which the side plate 34 is secured is bevelled at 49 to form a stop to be engaged by said side plate, a bottom edge portion 50 of the latter engaging said stop when said plate is located in the dotted position illustrated in Fig. 4.

Secured to the under surface of the ram head 7 is a mandrel 51 constituting a form for shaping the interior of the battery casing 23 to be molded, and said mandrel in this instance is provided with a plurality of grooves 52 which form partitions 53 in said casing 23. The mandrel 51 is preferably water cooled, being provided with passages 54 therein through which the water may circulate in a well-known manner.

The general operation of the mechanism hereinbefore specifically described is as follows:—Assuming that the various parts of the machine are positioned as illustrated in Figs. 3 and 4, a valve of the hydraulic press is actuated to force the piston rod 17 and bottom plate 18 attached thereto downwardly until the under surface of said bottom plate rests upon the upper surface of the base 5. During this downward movement of the plate 18 the side plates 25, 33 and 34 will all close inwardly as they recede into the passage 15 until they are located in the position illustrated in full lines in Fig. 1 and in dotted lines in Fig. 3, at which time the sides 48 of said plates will contact with the correspondingly tapered sides 16 of said passage, and said sides will thereafter form an abutment for said plates to hold the latter rigid during the molding operation.

A batch of plastic material sufficient to form the object to be molded is then cast into the cavity between the side plates and upon the bottom plate 19, and the valve controlling the ram head 7 is then actuated to cause said head to descend, carrying with it the mandrel 51, which upon entering said cavity, compresses the material causing the latter to flow about said mandrel and between the same and the faces of the plates 19, 26 and 35 and thereby mold the casing 23.

The descent of the ram head is stopped by a face 55 of the mandrel 51 engaging with the top of the side plates.

The casing 23 now having been formed, the valve controlling the ram head 7 is again actuated to cause said head to ascend, pulling the mandrel out of said casing. During the upward movement of the ram head, the side plates are held down, together with the bottom plate, by the pressure in the lower cylinder of the hydraulic press pulling down on the piston rod 17. When the ram head has reached a sufficient height in its stroke to fully release the mandrel from the casing 23, the operator reverses the valve in the lower cylinder of the press, causing the piston rod 17 and parts associated therewith to rise and opening the side plates to the positions illustrated in Figures 3 and 4. The operator then grasps the operating lever 40 and rocks the same downwardly until the edge portion 50 upon the side plate 34 engages the stop 49 provided upon the bottom plate 18, at which time said operating lever and side plate will be located in the dotted line position illustrated in Fig. 4.

The casing 23 that has just been formed may now be removed from the mold, after which the operating lever 40 will be actuated to return the side plate 34 to its initial position. The operation of the hand lever 40 is facilitated by the provision of the counterweight 47.

By providing the correspondingly tapered surfaces 48 and 16 upon the side plates and passage 15 respectively, it is possible to offset slight inequalities in the manufacture of the face plates 26 and 35 by manipulating the nuts 13 upon the adjusting studs 12, thereby raising or lowering the mold retaining ring 9 relatively to the upper surface of the base 5.

While the device of this invention is illustrated and described as being mounted upon a hydraulic press, it is evident that other means may be provided for furnishing the power for operating said device without departing from the spirit of said invention.

I claim:

1. A machine for forming articles from plastic material having, in combination, a base, a mold retaining member yieldingly mounted upon said base, a bottom plate adapted to rest in its lowermost position upon said base, a plurality of side plates pivotally attached at their lower ends to said bottom plate and operatively connected at their upper ends to said retaining member, means to move said bottom plate to successively close and open said side plates, and a form adapted to co-operate with said plates to mold an article therebetween.

2. A machine for forming articles from plastic material having, in combination, a base, a mold retaining member yieldingly mounted upon said base, means to position said retaining member longitudinally relatively to said base, a bottom plate adapted to rest in its lowermost position upon said base, a plurality of side plates pivotally attached at their lower ends to said bottom plate and operatively connected at their upper ends to said retaining member, means to move said bottom plate to successively close and open said side plates, and a form adapted to co-operate with said plates to mold an article therebetween.

3. A machine for forming articles from plastic material having, in combination, a base, a mold retaining member yieldingly mounted upon said base and provided with a passage extending therethrough, a bottom plate, a plurality of side plates pivotally mounted upon said bottom plate and operatively connected to said retaining member, means to move said bottom plate into engagement with said base and said side plates into a closed position within said passage, and a form adapted to co-operate with said plates to mold an article therebetween.

4. A machine for forming articles from plastic material having, in combination, a base, a mold retaining member yieldingly mounted upon said base and provided with a passage extending therethrough, means to position said retaining member relatively to said base, a bottom plate, a plurality of side plates pivotally mounted upon said bottom plate and operatively connected to said retaining member, means to move said bottom plate into engagement with said base and said side plates into a closed position within said passage, and a form adapted to co-operate with said plates to mold an article therebetween.

5. A machine for forming articles from plastic material having, in combination, a base, a mold retaining member mounted upon said base, and provided with a passage extending therethrough, means to position said retaining member relatively to said base, a bottom plate, a plurality of side plates pivotally mounted upon said bottom plate and operatively connected to said retaining member, means to move said bottom plate into engagement with said base and said side plates into a closed position within said passage, said last-named means finally returning all of said plates to their normal open positions, a form adapted to co-operate with said plates to mold an article therebetween, and means to move one of said side plates from a normal open position to an extreme open position.

6. A machine for forming articles from plastic material having, in combination, a base, a mold retaining member mounted upon said base and provided with a passage extending therethrough, means to position said retaining member relatively to said base, a bottom plate, a plurality of side plates pivotally mounted upon said bottom plate and operatively connected to said retaining member, means to move said bottom plate into engagement with said base and said side plates into a closed position within said passage, said last-named means finally returning all of said plates to their normal open positions, a form adapted to co-operate with said plates to mold an article therebetween, means to move one of said side plates from its normal open position to an extreme open position, and a counterweight for said last-named means and side plate.

7. A machine for forming articles from plastic material having, in combination, a base, a mold retaining member yieldingly mounted upon said base and provided with a tapered passage extending therethrough, means to position said retaining member relatively to said base, a bottom plate, a plurality of side plates pivotally mounted upon said bottom plate and operatively connected to said retaining member, means to simultaneously move said bottom plate into engagement with said base and said side plates into a closed position in engagement with the sides of said passage, and a form adapted to co-operate with said plates to mold an article therebetween.

8. A machine for forming articles from plastic material having, in combination, a base, a mold retaining member mounted upon said base and provided with a tapered passage extending therethrough, means to position said retaining member relatively to said base, a bottom plate, a plurality of side plates pivotally mounted upon said bottom plate and operatively connected to said retaining member, means to simultaneously move said bottom plate into engagement with said base and said side plates into a closed position in engagement with the sides of said passage, said last-named means finally returning all of said plates to their normal open positions, a form adapted to co-operate with said plates to mold an article therebetween, and means to move one of said side plates from a normal open position to an extreme open position.

9. A machine for forming articles from plastic material having, in combination, a base, a mold retaining member mounted upon said base and provided with a tapered passage extending therethrough, means to position said retaining member relatively to said base, a bottom plate, a plurality of side plates pivotally mounted upon said bottom plate and operatively connected to said retaining member, means to simultaneously move said bottom plate into engagement with said base and said side plates into a closed position in engagement with the sides of said passage, said last-named means finally returning all of said plates to their normal open positions, a form adapted to co-operate with said plates to mold an article therebetween, means to move one of said side plates from its normal open position to an extreme open position, and a counterweight for said last-named means and side plate.

10. A machine for forming articles from plastic material having, in combination, a base, a mold retaining member yieldingly mounted upon said base, and provided with a passage extending therethrough, a bottom plate, a plurality of side plates pivotally attached at their lower ends to said bottom plate, a pair of links attached to the top of each of said side plates and operatively connecting the latter to said retaining member, means to move said bottom plate into engagement with said base and said side plates into a closed position within said passage, and a form adapted to co-operate with said plates to mold an article therebetween.

11. A machine for forming articles from plastic material having, in combination, a base, a mold retaining member yieldingly mounted upon said base and provided with a tapered passage extending therethrough, a bottom plate, a plurality of side plates pivotally attached at their lower ends to said bottom plate, the outer surface of each of said side plates tapering downwardly toward the inner face thereof, a pair of links attached to the top of each of said side plates and operatively connecting the latter to said retaining member, means to move said bottom plate into engagement with said base and said side plates into a closed position with the outer surface thereof engaging tapered surfaces of said passage, and a form adapted to co-operate with said plates to mold an article therebetween.

12. A machine for forming articles from plastic material having, in combination, a base, a mold retaining member mounted upon said base and provided with a tapered passage extending therethrough, a bottom plate, a plurality of side plates pivotally attached at their lower ends to said bottom plate, the outer surface of each of said side plates tapering downwardly toward the inner face thereof, a pair of links attached to the top of each of said side plates and operatively connecting the latter to said retaining member, means to move said bottom plate into engagement with said base and said side plates into a closed position with the outer surfaces thereof engaging the surfaces of said tapered passage, said last-named means finally returning all of said plates to their normal open positions, a form adapted to co-operate with said plates to mold an article therebetween, means for actuating a pair of said links, whereby the side plate connected thereto is moved from its normal open position to an extreme open position, and a counterbalance for said last-named means.

13. A machine for forming articles from plastic material having, in combination, a base, a mold retaining member mounted upon said base, means to position said retaining member relatively to said base, brackets mounted upon said retaining member, a bottom plate, a plurality of side plates pivotally attached at their lower ends to said bottom plate, a pair of links attached to the tops of each of said side plates and connecting the latter with said brackets, means to move said bottom plate to successively close and open said side plates, a form adapted to co-operate with said plates to mold an article therebetween, means for actuating a pair of said links, whereby the side plate connected thereto is moved from its normal open position to an extreme open position, and a counterbalance for said last-named means.

In testimony whereof I have hereunto set my hand.

LOUIS J. SCHROEDER.